(12) United States Patent
Chen

(10) Patent No.: US 6,474,089 B1
(45) Date of Patent: Nov. 5, 2002

(54) NATURAL AIR-CONDITIONING SYSTEM FOR A CAR

(76) Inventor: Sih-Li Chen, No. 3, Alley 28, Lane 123, Sec. 3. JenAi Rd., Taipei (TW)

(*) Notice: Subject to any disclaimer, the term of this patent is extended or adjusted under 35 U.S.C. 154(b) by 0 days.

(21) Appl. No.: 09/965,823

(22) Filed: Oct. 1, 2001

(51) Int. Cl.⁷ .............................................. F25B 27/00
(52) U.S. Cl. ........................ 62/235.1; 62/236; 62/244
(58) Field of Search ....................... 62/434, 236, 235.1, 62/244

(56) References Cited

U.S. PATENT DOCUMENTS

| | | | | |
|---|---|---|---|---|
| 3,156,101 A | * | 11/1964 | McGuffey | 62/175 |
| 3,943,726 A | * | 3/1976 | Miller | 136/291 |
| 6,244,062 B1 | * | 6/2001 | Prado | 62/235.1 |
| 6,253,563 B1 | * | 7/2001 | Ewert et al. | 62/235.1 |
| 6,327,871 B1 | * | 12/2001 | Rafalovich | 62/434 |
| 6,357,246 B1 | * | 3/2002 | Jin | 62/235.1 |

* cited by examiner

Primary Examiner—William E. Tapolcai
Assistant Examiner—Mohammad M. Ali
(74) Attorney, Agent, or Firm—Dennison, Schultz & Dougherty

(57) ABSTRACT

A natural air conditioning system for a car is characterized in a heat energy accumulator, a car battery, a cooler, and a solar collector panel connected to compressor, fan and condenser assembly, expansion valve, and fan and evaporator assembly that are included in a typical car air conditioning system. When the car air conditioning system is in operation, a part of cold energy produced in the system is stored in the heat energy accumulator and the cooler. And, when the car air conditioning system is in an off state, power provided by the solar collector panel or the car battery drives the fan associated with the evaporator and cold energy previously stored in the heat storage accumulator is released to keep an indoor space of the car at a comfortable temperature. Cold energy stored in the cooler also enables the cooler to serve as a spare car refrigerator.

1 Claim, 5 Drawing Sheets

NATURAL AIR-CONDITIONING SYSTEM FOR A CAR

BACKGROUND OF THE INVENTION

In our daily life, there are various forms of energy being wasted because there is not effective way for storing and utilizing the energy. An example of such wasted energy is the cold energy produced by a car air conditioning system. The wasted energy dissipates in the air and would sometimes form exhaust to pollute the environment. It is therefore desirable to recycle, store and utilize the lost energy to reduce environment pollution while increase the benefit of usable energy in our daily life.

SUMMARY OF THE INVENTION

A primary object of the present invention is to provide a natural air conditioning system for a car to enable storage of a part of cold energy produced by the car air conditioning system when the same is in operation, so that the stored cold energy could be released to keep an indoor space of the car at a comfortable temperature when the car air conditioning system is turned off.

Another object of the present invention is to provide a natural air conditioning system for a car that includes a solar collector panel adapted to work with a fan to speed up air convection in the car when the car is moving and the air conditioning system is in operation. Thereby, an enhanced cooling effect could be achieved with the same air conditioning system.

A further object of the present invention is to provide a natural air conditioning system for a car to enable storage of a part of surplus cold energy produced by the car air conditioning system in a cooler, so that the cooler also serves as a spare car refrigerator.

To achieve the above and other objects, the natural air conditioning system for a car according to the present invention is characterized in a heat energy accumulator, a car battery, a cooler, and a solar collector panel connected to a compressor, a fan and condenser assembly, an expansion valve, and a fan and evaporator assembly that are included in a typical car air conditioning system. When the car air conditioning system is in operation, a part of cold energy produced in the system is stored in the heat energy accumulator and the cooler. And, when the car air conditioning system is in an off state, power provided by the solar collector panel or the car battery drives the fan associated with the evaporator and cold energy previously stored in the heat storage accumulator is released to keep an indoor space of the car at a comfortable temperature. Cold energy stored in the cooler also enables the cooler to serve as a spare car refrigerator.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
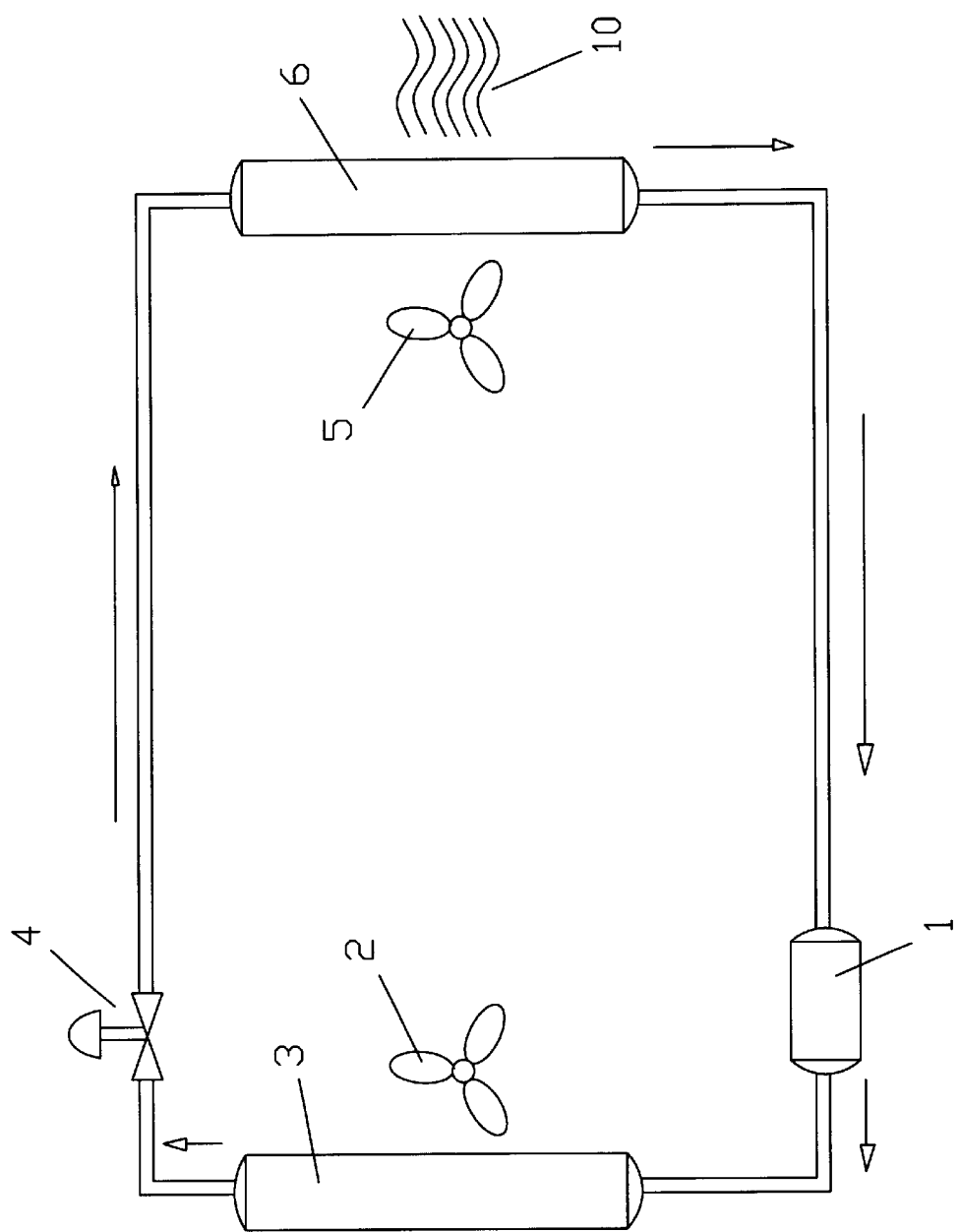
FIG. 1 shows a conventional air conditioning system for a car.

Please refer to FIG. 1 that shows a conventional air conditioning system for a car. When an engine of the car is started and the air conditioning system is turned on, a compressor 1 is driven by the car engine to compress an amount of refrigerant. The compressed refrigerant passes an assembly of a first fan 2 and a condenser 3 as well as an expansion valve 4 and finally reaches an assembly of a second fan 5 and an evaporator 6 to release cold air 10, so as to lower the temperature in the car. When the above-described air conditioning system operates, there is not any means provided in the system to store any surplus cold energy. Once the car engine is turned off, the compressor 1 is no longer driven to work and no cold air 10 is supplied. When the car is parked outdoors, particularly in the strong sunshine, the temperature in the car gradually increases to a sultry degree that would discomfort anyone who gets in the car at this moment. Such uncomfortable sultry condition continues until the car engine has been started again to drive the air conditioning system for at least several minutes.

Figure 2:
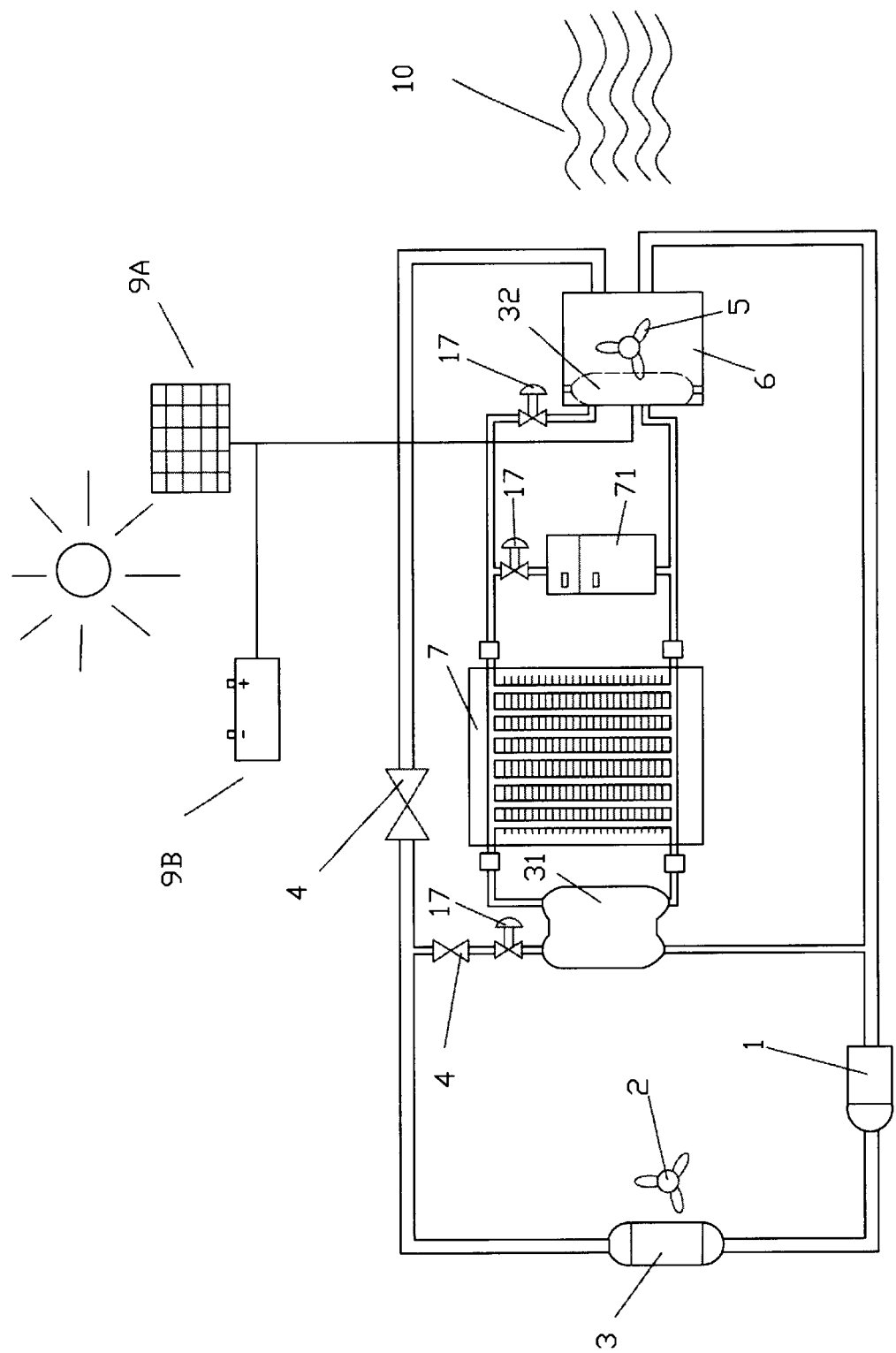
FIG. 2 shows an air conditioning system for a car according to the present invention.

FIG. 2 shows a natural air conditioning system for a car according to the present invention. As shown, the natural air conditioning system for a car according to the present invention includes a heat energy accumulator 7, a cooler 71, and a solar collector panel 9A and/or a car battery 9B in addition to the compressor 1, the first fan 2, the condenser 3, the expansion valve 4, the second fan 5, and the evaporator 6 that are typically included in the conventional air conditioning system for a car as shown in FIG. 1.

Figure 3:
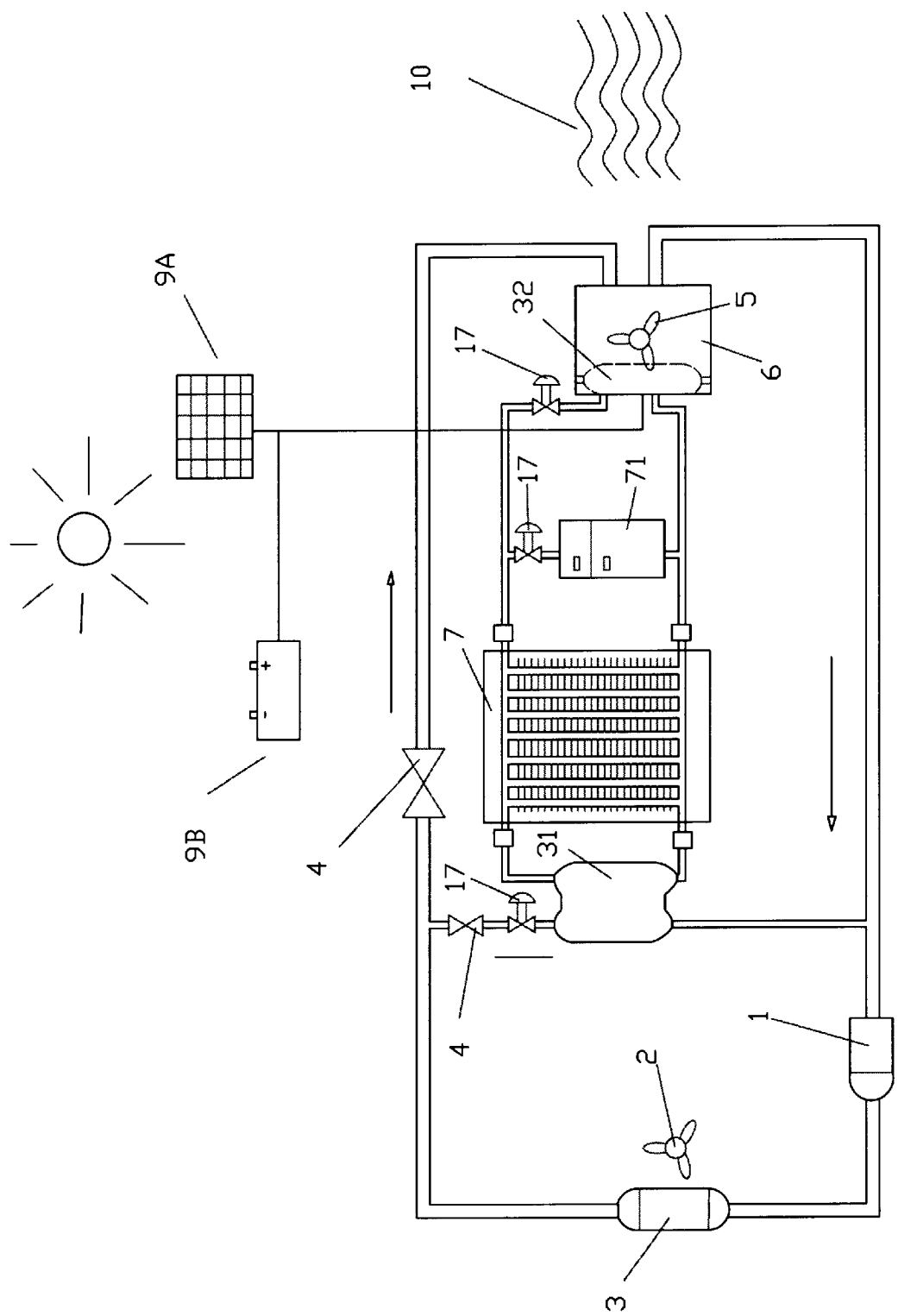
FIG. 3 shows the manner in which cold energy is stored when the air conditioning system for a car of the present invention is in an operating state.

FIG. 3 shows cold energy is stored when the natural air conditioning system for a car of the present invention is in an operating state. More specifically, when the natural air conditioning system for a car of the present invention operates while the car is moving, the compressor 1 compresses the refrigerant and sends the compressed refrigerant through the condenser 3 and the expansion valve 4 to finally provide cold air 10. Meanwhile, a part of surplus cold energy is stored in the heat energy accumulator 7 alone or in both the heat energy accumulator 7 and the cooler 71, just as using a general electric accumulator. A valve switch 17 is mounted on each pipe parallelly connecting the cooler 71 to the heat energy accumulator 7 and the evaporator 6. The valve switches 17 may be freely controlled by a user to an on or off position, so that the user may, in the process of storing surplus cold energy, select for the refrigerant to flow through the cooler so as to store a part of the cold energy in the cooler 71 or for the refrigerant to directly flow through the revaporator 6 for producing cold air 10, depending on a load size used by the refrigerant at that time.

Figure 4:
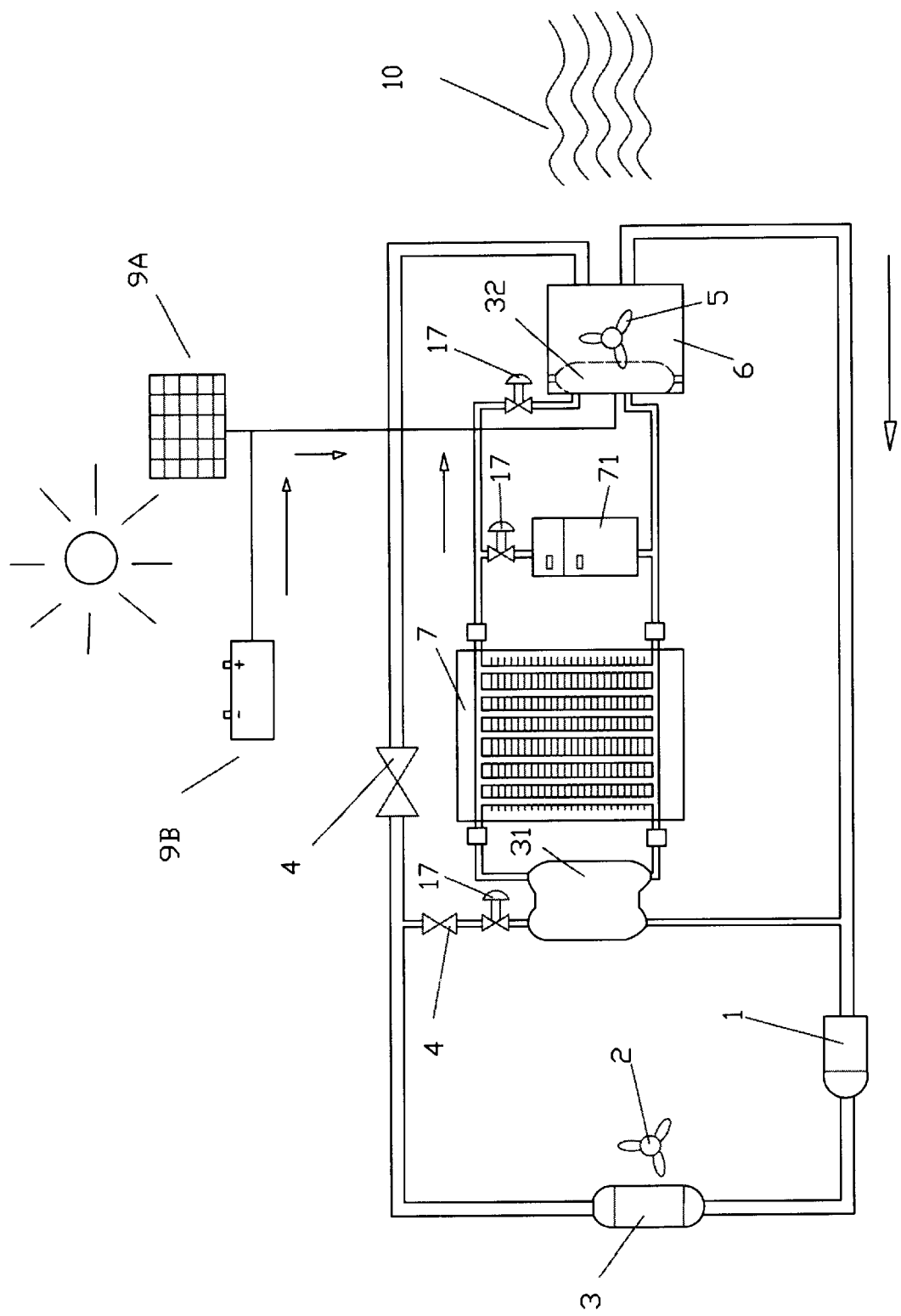
FIG. 4 shows the manner in which cold energy is released when the air conditioning system for a car of the present invention is in an off state.

When the car is parked outdoors in the strong sunshine and the air conditioning system is turned off, the second fan 5 could be driven by power from the solar collector panel 9A to release the cold energy stored in the heat energy accumulator 7. In the case there is not sufficient solar energy, the second fan 5 may also be driven by the car battery 9B, as shown in FIG. 4.

Figure 5:
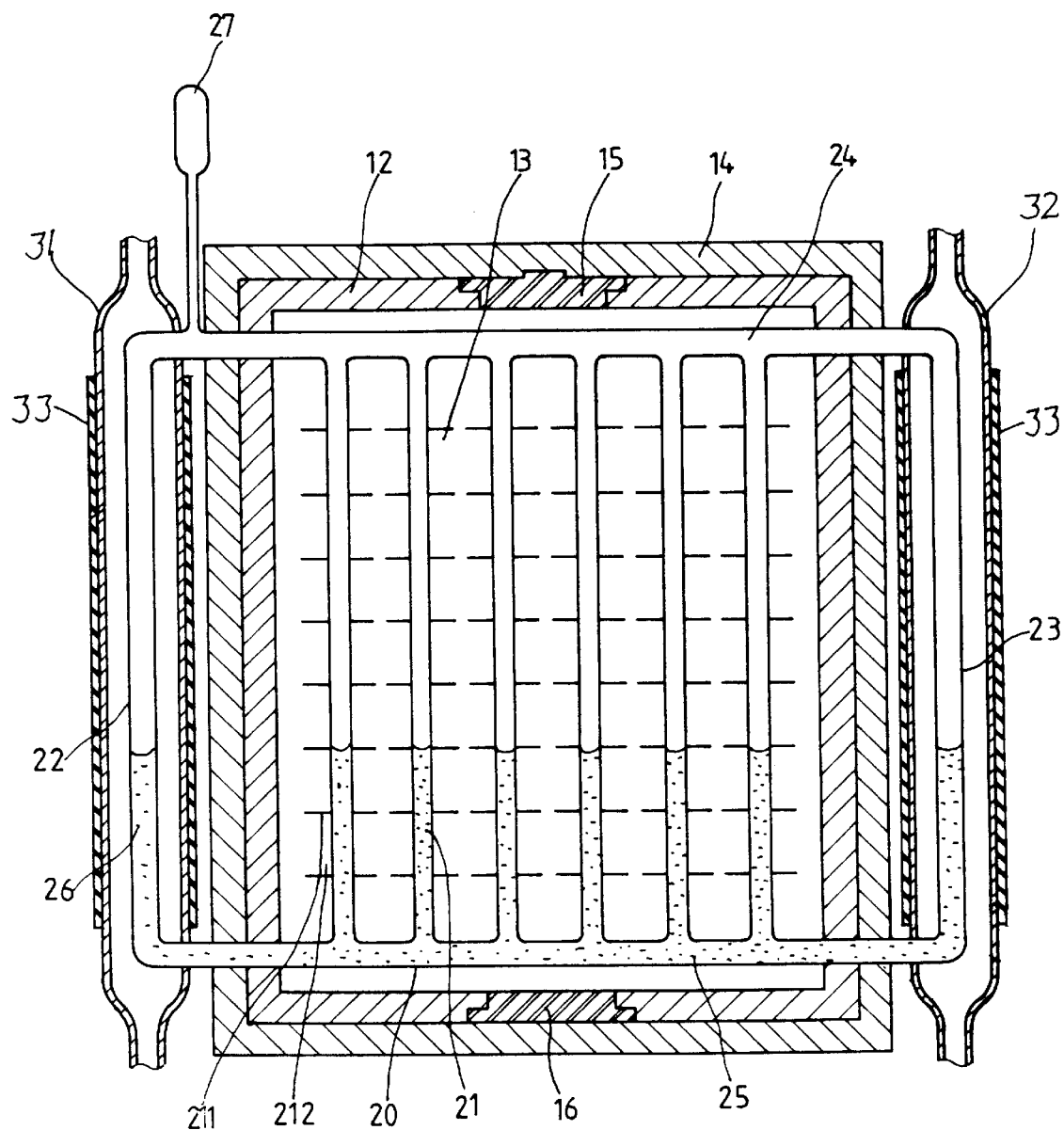
FIG. 5 is a sectioned plan view of a heat energy accumulator adopted in the present invention.

FIG. 5 is a sectioned plan view of the heat energy accumulator 7 included in the natural air conditioning system for a car according to the present invention. As shown, the heat energy accumulator 7 includes an energy storage chamber 12 and a loop-type heat pipe 20 associated with the energy storage chamber 12.

The energy storage chamber 12 is filled with an amount of phase change medium 13 that stores and releases cold energy through freezing into and melting from a solid phase. The energy storage chamber 12 is externally coated with an insulation material 14 to prevent heat loss, and could be replenished with new phase change medium 13 via an upper lid 15 provided at a top of the chamber 12. A drain hole 16 is provided at a bottom of the chamber 12 for draining the phase change medium 13.

The loop-type heat pipe 20 is divided into three main parts. The first part is a set of paralleled pipes 21 being vertically disposed inside the chamber 12 and provided on an outer surface with a plurality of densely distributed short fins 211 that extend in a direction perpendicularly to the pipes 21. These short fins 211 allow the paralleled pipes 21 to have an increased heat-conducting area and form a plurality of energy storage cells 212 in the energy storage chamber 12. Both the freezing and the melting of the phase change medium 13 occur in the energy storage cells 212 when the phase change medium 13 stores and releases energy, respectively.

The second part of the loop-type heat pipe 20 includes a vertical low-temperature heat pipe 22 and a vertical high-temperature heat pipe 23 located outside the energy storage chamber 12 for proceeding heat exchange with high-temperature and low-temperature driving fluids, respectively. The high-temperature and the low-temperature heat pipes 22, 23 are provided on inner and outer surfaces with a plurality of fins 211 or helically grooved tubes to enhance the heat-conducting ability thereof when the driving fluids are a type of gas (air) or in vapor phase or liquid phase, such as water or other liquid type of refrigerant.

The third part of the loop-type heat pipe 20 includes an upper horizontal pipe 24 and a lower horizontal pipe 25 for connecting the vertical paralleled pipes 21 in the chamber 12 to the vertical low-temperature and high-temperature heat pipes 22, 23 outside the chamber 12 so as to form the loop-type heat pipe 20.

The loop-type heat pipe 20 is filled with an adequate amount of appropriate working fluid 26 that may be water or refrigerant, such as Freon. A pressure-limiting safety compartment 27 is located outside the energy storage chamber 12 to communicate with the vertical low-temperature heat pipe 22, so as to provide a buffer space for the working fluid 26 when the same is filled into and/or expanded in the loop-type heat pipe 20. The vertical low-temperature heat pipe 22 and the vertical high-temperature heat pipe 23 pass through a low-temperature heat exchanger 31 and a high-temperature heat exchanger 32, respectively. The two heat exchangers 31, 32 provide flowing passages for the driving fluids outside the two vertical pipes 22, 23, so that heat exchange between the driving fluids and the vertical low-temperature and the vertical high-temperature heat pipes 22, 23 occurs in the low-temperature and the high-temperature heat exchangers 31, 32, respectively. The two heat exchangers 31, 32 are coated at outer sides with an insulation material 33 to prevent heat dissipation during operation or shutdown of the natural air conditioning system of the present invention.

FIG. 3 shows the manner of storing a part of cold energy when the natural air conditioning system for a car according to the present invention is in operation. The refrigerant flows to the compressor 1 as indicated by the arrow in the drawing, and is compressed and delivered to the condenser 3. When the compressed refrigerant flows through the expansion valve 4, a part of the refrigerant that has a low temperature flows to the evaporator 6, allowing the second fan 5 to send out cold air 10. Thereafter, the refrigerant flows back to the compressor 1 to complete one cycle of flow in the air conditioning system. Meanwhile, another part of the refrigerant flown through the expansion valve 4 flows downward to pass the low-temperature heat exchanger 31 of the heat energy accumulator 7 and freezes the phase change medium 13 in the energy storage chamber 12, so that cold energy is stored in the heat energy accumulator 7. And, when the load used by the refrigerant at that time is low, the valve switch 17 mounted on the heat pipe led to the cooler 71 could be turned open, so that a part of the surplus cold energy could be stored in the cooler 71 at the same time. The cooler 71 could therefore serve as a spare car refrigerator. The refrigerant flown through the heat energy accumulator 7 and the cooler 71 will then flows back to the compressor 1 to complete one cycle of flow.

FIG. 4 shows the manner in which the stored cold energy is released when the car is in a parked state and the compressor 1 of the air conditioning system is in an off state. At this point, electric energy provided by the solar collector panel 9A or the car battery 9B is used to drive the second fan 5, so that hot air convects in a direction as indicated by the arrows in the drawing, and flows through the heat energy accumulator 7. At this point, the cold energy stored in the accumulator 7 is released to cool the hot air, allowing cold air 10 to be sent out via the second fan 5 to lower the temperature in the parked car.

What is claimed is:

1. A natural air conditioning system for a car comprising a heat energy accumulator, a cooler, and a solar collector panel and/or a car battery connected to a compressor, a first fan associated with a condenser, an expansion valve, and a second fan associated with an evaporator that are included in a general car air conditioning system; a refrigerant provided in said natural air conditioning system being compressed by said compressor and then flowing through said condenser and said expansion valve with a part of said refrigerant flowing through said heat energy accumulator or said cooler, so that surplus cold energy is stored in said heat energy accumulator or said cooler before said a part of refrigerant flows back to said compressor to complete one cycle of flow in said natural air conditioning system, wherein said heat energy accumulator includes an energy storage chamber and a loop-type heat pipe associated with said energy storage chamber;

said energy storage chamber being filed with a phase change medium that stores and releases cold energy through freezing into and melting from a solid phase, and being externally coated with an insulation material to prevent heat loss; and said energy storage chamber being provided at a top with an upper lid for replenishing said energy storage chamber with said phase change medium via said upper lid, and at a bottom with a drain hold for draining said phase change medium; and said loop-type heat pipe being divided into three main parts, namely, first, second and third parts;

said first part being a set of paralleled pipes vertically disposed inside said energy storage chamber and having a plurality of densely distributed short fins provided on an outer surface thereof to extend in a direction perpendicularly to said paralleled pipes;

said second part including a vertical low-temperature heat pipe and a vertical high-temperature heat pipe located outside said energy storage chamber for conducting heat exchange with low-temperature and high-temperature driving fluids, respectively; both said low-temperature and said high-temperature heat pipes being provided on inner and outer surfaces with a plurality of fins or helically grooved tubes; and said third part including an upper horizontal pipe and a lower horizontal pipe for connecting said vertical paralleled pipes inside said energy storage chamber to said vertical low-temperature and said high-temperature heat pipes outside said energy storage chamber so as to form said loop-type heat pipe;

said loop-type heat pipe being filled with an adequate amount of appropriate working fluid, and having a pressure-limiting safety compartment located outside said energy storage chamber to communicate with said vertical low-temperature heat pipe; and said vertical low-temperature heat pipe and said vertical high-temperature heat pipe of said loop-type heat pipe being provided around an outer surface with flowing passages, that is, a low-temperature heat exchanger and a high-temperature heat exchanger, respectively, through which driving fluids of low-temperature and of high-temperature flowing to conduct heat exchange with said vertical low-temperature and said vertical high-temperature heat pipes, respectively; and said low-temperature and said high-temperature heat exchangers being externally coated with an insulation material.

\* \* \* \* \*